United States Patent
Wood, III et al.

(10) Patent No.: US 9,785,214 B2
(45) Date of Patent: Oct. 10, 2017

(54) SYSTEM AND METHOD FOR COMPENSATING FOR CABLE VOLTAGE LOSS AT VARIOUS OUTPUT VOLTAGES

(71) Applicant: Dell Products, LP, Round Rock, TX (US)

(72) Inventors: Merle J. Wood, III, Round Rock, TX (US); Anson Liao, Taoyuan (TW); Jason Yu, Taipei Tucheng (TW)

(73) Assignee: DELL PRODUCTS, LP, Round Rock, TX (US)

( * ) Notice: Subject to any disclaimer, the term of this patent is extended or adjusted under 35 U.S.C. 154(b) by 156 days.

(21) Appl. No.: 14/632,518

(22) Filed: Feb. 26, 2015

(65) Prior Publication Data
US 2016/0254752 A1    Sep. 1, 2016

(51) Int. Cl.
| | |
|---|---|
| H02M 3/22 | (2006.01) |
| G01R 15/14 | (2006.01) |
| G06F 1/30 | (2006.01) |
| H02M 3/28 | (2006.01) |
| G06F 1/26 | (2006.01) |
| H02M 1/00 | (2006.01) |

(52) U.S. Cl.
CPC ............. G06F 1/305 (2013.01); G06F 1/26 (2013.01); H02M 3/28 (2013.01); H02M 2001/0025 (2013.01)

(58) Field of Classification Search
CPC ..... H02M 3/22; G01R 19/0084; G01R 15/14; G06F 1/305
USPC ........................................................ 324/424
See application file for complete search history.

(56) References Cited

U.S. PATENT DOCUMENTS

| | | | |
|---|---|---|---|
| 5,754,943 A | 5/1998 | Arai et al. | |
| 7,668,236 B2 | 2/2010 | Lee | |
| 2010/0281284 A1* | 11/2010 | Kasprzak | G06F 1/30 713/324 |

* cited by examiner

*Primary Examiner* — Billy Lactaoen
(74) *Attorney, Agent, or Firm* — Larson Newman, LLP

(57) ABSTRACT

A power adapter includes a primary side and a secondary side. The primary side rectifies an alternating current voltage. The secondary side is coupled to the primary side, provides a direct current voltage of a specific voltage level to a cable. The second side includes a sensing resistor, and a compensation circuit. The compensation circuit monitors a voltage level across the sensing resistor, and injects a current into the cable based on the voltage level across the sensing resistor.

15 Claims, 5 Drawing Sheets

SYSTEM AND METHOD FOR COMPENSATING FOR CABLE VOLTAGE LOSS AT VARIOUS OUTPUT VOLTAGES

FIELD OF THE DISCLOSURE

The present disclosure generally relates to system and method for compensating for cable voltage loss at various output voltages.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system, such as a laptop computer, can utilize an alternating current (AC) power adapter to convert an AC voltage to a direct current (DC) voltage to charge a battery of the laptop computer. The AC adapter can be connected to the laptop computer via a power cord.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
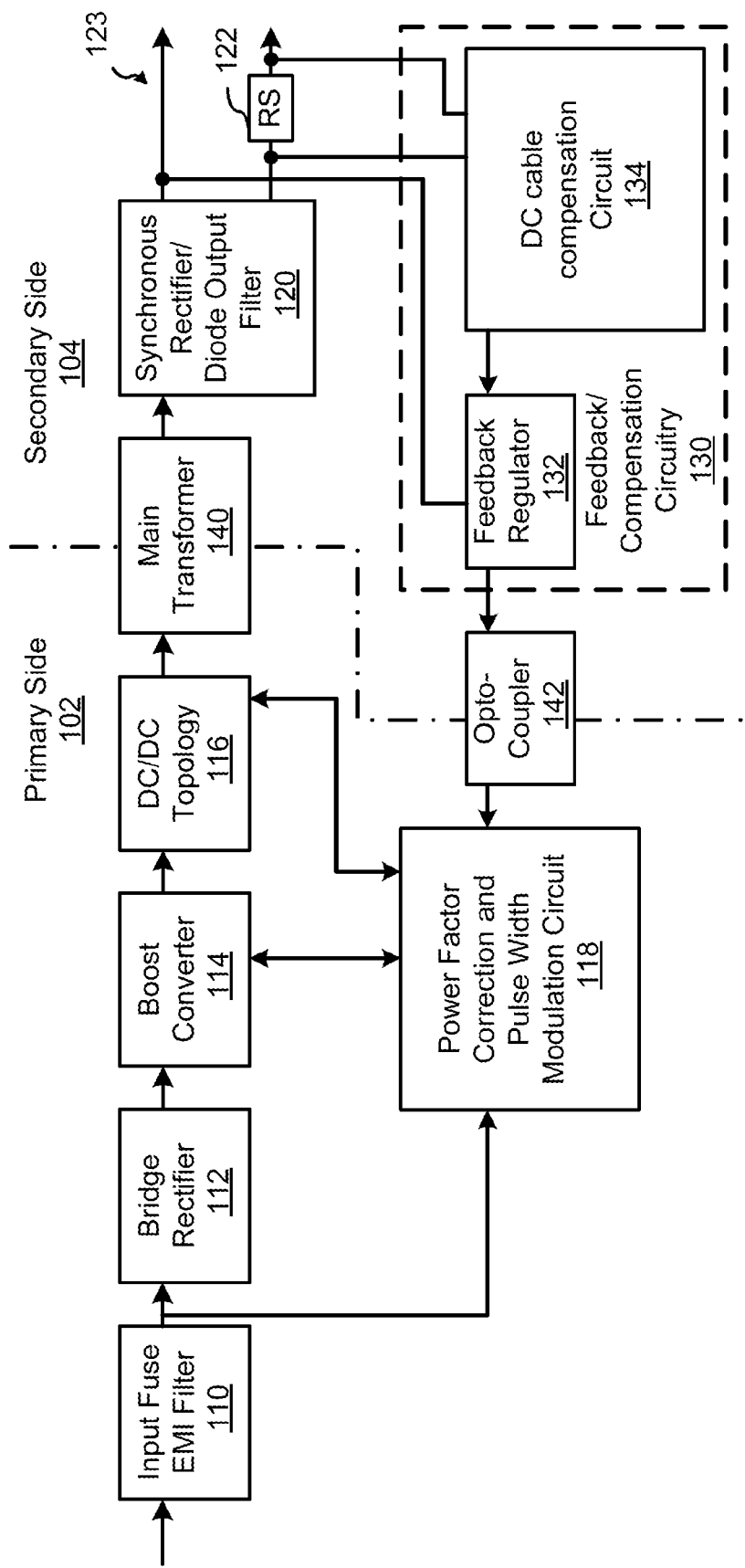
FIG. 1 is a block diagram of an alternating current power adapter according to at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (e.g., personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, an alternating current (AC) power adapter for an information handling system includes a primary side and a secondary side. The primary side may include multiple components to rectify an AC input voltage and to provide a direct current voltage to the secondary side. The secondary side may include multiple components, such as a sensing resistor and feedback/compensation circuitry, may provide the DC voltage to an information handling system via a cable, and may provide feedback to the primary side to regulate the DC voltage. In an embodiment, the feedback/compensation circuitry may include a feedback regulator and a compensation circuit.

During operation, an output voltage at the components of the secondary side can cause a corresponding current on the cable to be provided to the information handling system. However, as the current on the cable increases, there can be a corresponding and proportional voltage drop on the cable due to the resistance of the cable. Thus, the higher the current on the cable the larger the voltage drop, which can cause the voltage at information handling system not to be the same voltage as output from the secondary side of the AC power adapter.

In an embodiment, the compensation circuit can monitor the voltage level of the sensing resistor in the cable, and the voltage across the sensing resistor can increase as the current provided on the cable increases. Thus, the compensation circuit can determine that as the voltage of the sensing resistor increases, the voltage drop across the cable also increase. Therefore, the compensation circuit can inject a current into the cable to increase the voltage provided to, and received at, the information handling system. This increased voltage level can overcome the voltage drop of the cable so that the desired voltage is received at the information handling system. In an embodiment, the desired voltage level provided to the information handling system can be 5 volts, 12 volts, 20 volts, or the like. In an embodiment, the amount of current injected into the cable by the compensation circuit can increase as the voltage of the sensing resistor increases.

In an embodiment, as the desired voltage level increases the amount of current injected into the cable can also be increased. For example, a higher amount of current can be injected into the cable when the desired voltage is 12 volts as compared to when the desired voltage is 5 volts. Therefore, the compensation circuit can receive an indication of the desired voltage from an MCU, and this indication signal can control the number of switches, within the compensation circuit, that are closed so that a higher current level can be injected into the cable. For example, the higher the desired voltage level to be provided to the information handling system, the more switches that are closed, which in turn causes a higher level of the injection current provided to the cable. Thus, the compensation circuit can inject different amounts of current into the cable to compensation for the voltage drop across the cable, and the different amounts of current can be based on the voltage across the sensing resistor in the cable and an indication of the desired voltage for the information handling system.

FIG. 1 shows an alternating current (AC) power adapter 100 for an information handling system according to at least one embodiment of the present disclosure. The AC power adapter 100 includes a primary side 102 and a secondary side 104. In an embodiment, the primary side 102 may include an input filter 110, a bridge rectifier 112, a boost converter 114, direct current/direct current (DC/DC) topology circuit 116, a power factor correction (PFC), and pulse width modulation (PWM) circuit 118. In an embodiment, the secondary side may include a rectifier/diode output filter 120, a sensing resistor 122, and feedback/compensation circuitry 130. The feedback/compensation circuitry 130 may include a feedback regulator 132 and a compensation circuit 134. In an embodiment, the primary side 102 and the secondary side 104 can be coupled together via both a transformer 140 and an opto-coupler 142.

During operation, the input filter 110, such as an electromagnetic interference (EMI) filter, can filter EMI from the input AC voltage. The filtered AC voltage is then provided to the bridge rectifier 112, which in turn can provide full-wave rectification on the filtered AC voltage. The bridge rectifier 112 then provides the rectified input voltage to the boost converter 114. In an embodiment, the boost converter 114 increases the rectified voltage to a specific voltage level, such as 5 volts, 12 volts, 20 volts, or the like, based on a control signal received from the PFC and PWM circuit 118. In an embodiment, the DC/DC topology circuit 116 is utilized to further regulate the DC voltage prior to the DC voltage being provided to the transformer 140.

In an embodiment, the DC voltage provided to the transformer 140 can create a current on the primary side 102 of the transformer, which in turn can induce a current on the secondary side 104 of the transformer. The induced current on the secondary side 104 of the transformer 140 can then be provided to the rectifier/diode output filter 120. In an embodiment, the transformer 140 can be utilized to isolate the current and voltage of the primary side 102 of the AC adapter 100 from the current and voltage of the secondary side 104. The rectifier/diode output filter 120 can then provide the voltage to an information handling system via a cable 123.

The feedback regulator 132 can measure the output voltage on cable 123, and compare the measured output voltage to a reference voltage. The feedback regulator 132 can then provide a feedback signal based on the comparison between the measured output voltage to the reference voltage to the PFC and PWM circuit 118 via the opto-coupler 142. In an embodiment, the PFC and PWM circuit 118 can provide control signals to the boost converter 114 and the DC/DC topology 116 based on a signal received from the input filter 110, and the feedback signal received from the feedback regulator 132 via the opto-coupler 142. The boost converter 114 and the DC/DC topology 116 can utilize the control signals to control the DC voltage provided to the transformer 140.

The output voltage from the rectifier/diode output filter 120 can cause a corresponding current on the cable 123. In an embodiment, the cable 123 can be a DC cord for AC adapters, for cable docking solutions, or the like to provide the current to the information handling system. In an embodiment, as the current on the cable 123 increases, there can be a corresponding and proportional voltage drop on the cable due to the resistance of the cable. Thus, the higher the current on the cable 123 the larger the voltage drop, which can cause the voltage received at information handling system to not be the voltage provided by the rectifier/diode output filter 120.

The compensation circuit 134 can monitor the voltage level of the sensing resistor 122. In an embodiment, the voltage across the sensing resistor 122 can increase as the current provided on the cable 123 increases. Thus, the compensation circuit 134 can determine that as the voltage of the sensing resistor 122 increases, the voltage drop across the cable 123 also increases. Therefore, the compensation circuit 134 can inject a current in between the compensation circuit and the feedback regulator 132, which can cause the output voltage provided on the cable 123 from the output filter 120 to increase. In an embodiment, the injected current can increase the voltage applied to the feedback regulator 132, and the increased voltage can result in the feedback regulator providing the PFC and PWM circuit 118 with a signal indicating to increase the output voltage provided at the output filter 120. In this embodiment, the current injected by the compensation circuit 134 can increase the output voltage to overcome the voltage drop of the cable 123 so that the desired voltage is provided to the information handling system. In an embodiment, the amount of current injected by the compensation circuit can increase proportionally to the increase in the voltage across the sensing resistor 122 increases.

Figure 2:
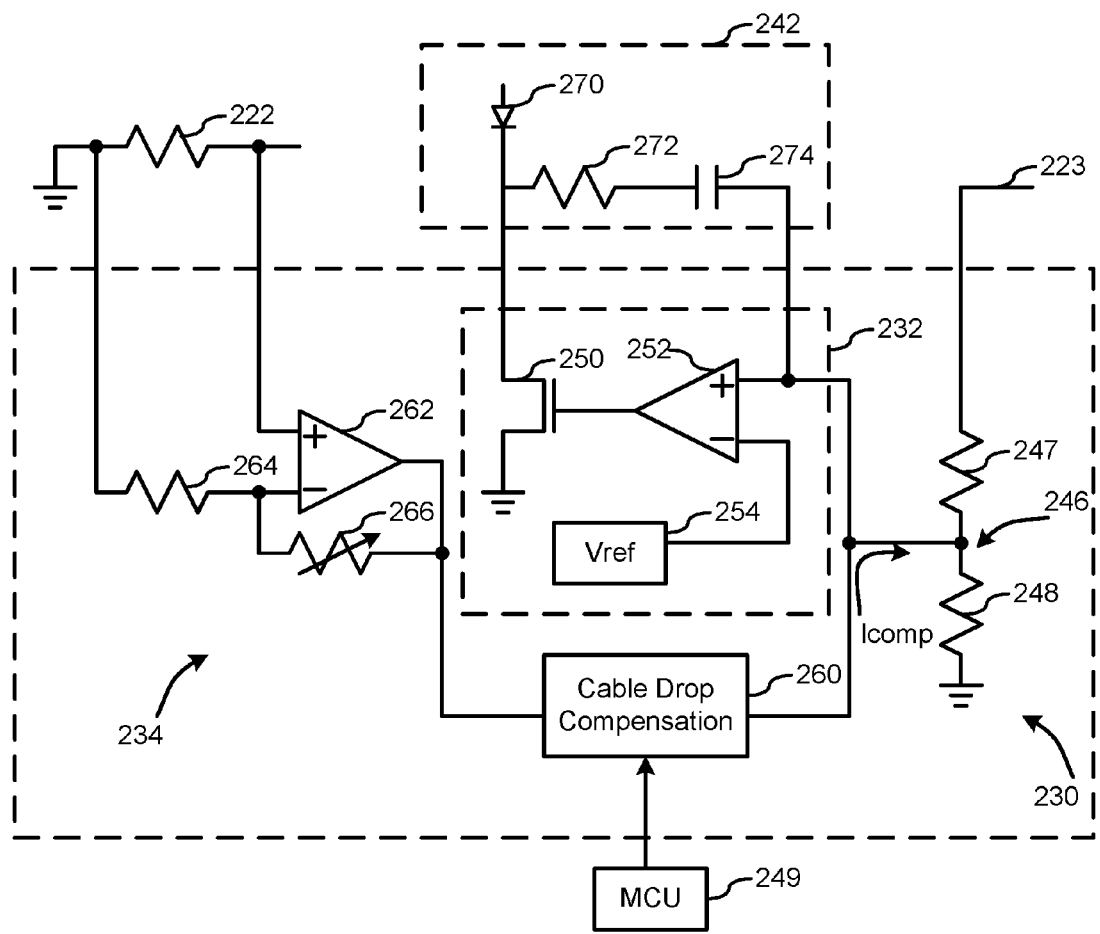
FIG. 2 is a schematic of an embodiment of a portion of the alternating current power adapter according to at least one embodiment of the present disclosure.

FIG. 2 shows a portion of an alternating current power adapter 200 according to at least one embodiment of the present disclosure. The AC power adapter 200 may include a sensing resistor 222, a cable 223, feedback/compensation circuitry 230, which in turn includes a feedback regulator 232 and a compensation circuit 234, an opto-coupler 242, and a microcontroller unit (MCU) 249. In an embodiment, the feedback regulator 232 may include a transistor 250, a comparator 252, and a voltage reference 254. The transistor 250 includes a first current electrode coupled to the opto-coupler 242, a second current electrode coupled to a ground, and control electrode. The comparator 252 includes a first input terminal coupled to the opto-coupler 242, to the feedback/compensation circuitry 234, and to the cable 223, a second input terminal, and an output terminal coupled to the control electrode of the transistor 250. The voltage reference 254 includes an output terminal coupled to the second input terminal of the comparator 252. In an embodiment, the transistor 250, the comparator 252, and the voltage reference 254 combine to provide a feedback voltage to the opto-coupler 242. In this embodiment, the comparator 252 compares the voltage on cable 223 with the voltage provided by the reference voltage 254. The comparator 252 then provides an output voltage to the transistor 250 based on the comparison, and the output voltage turns on the transistor 250 to cause a current, such as the feedback signal discussed above, to flow through the opto-coupler 242.

In an embodiment, the opto-coupler 242 includes a diode 270, a resistor 272, and a capacitor 274. The diode 270 includes a first current electrode, and a second current electrode coupled to the first current electrode of the transistor 250 of the feedback regulator 232. The resistor 272 includes a first terminal coupled to the second current electrode of the diode 270, and a second terminal. The capacitor 274 includes a first terminal coupled to the second terminal of the resistor 272, and a second terminal coupled to the first input terminal of the comparator 252 of the feedback regulator 232. In an embodiment, the components of the opto-coupler 242 combine to provide the feedback signal from the feedback regulator 232 to a primary side, such as primary side 102 of FIG. 1, of the AC power adapter 200.

In an embodiment, the compensation circuit 234 includes a cable drop compensation circuit 260, a comparator 262, resistors 264 and 266, and a voltage divider 246, which in turn includes resistors 247 and 248. The cable drop compensation circuit 260 includes a first input terminal, a second input terminal coupled to the MCU 249, and an output terminal coupled to the first input terminal of the comparator 252 of the feedback regulator 232. The comparator 262 includes a first input terminal coupled to a first terminal of the sensing resistor 222, a second input terminal, and an output terminal coupled to the first input terminal of the cable drop compensation circuit 260. The resistor 264 includes a first terminal coupled to the second terminal of the sensing resistor 222, and a second terminal coupled to the second input terminal of the comparator 262. The resistor 266 includes a first terminal coupled to the second input terminal of the comparator 262, and a second terminal coupled to the output terminal of the comparator. The resistor 247 of the voltage divider 246 includes a first terminal coupled to the cable 223, and a second terminal coupled to the first input terminal of the comparator 252 and to the output terminal of the cable drop compensation circuit 260. The resistor 248 of the voltage divider 246 includes a first terminal coupled to second terminal of the resistor 247, and a second terminal coupled to ground.

During operation, the comparator 262 of the compensation circuit 234 determines the voltage across the sensing resistor 222 by comparing the voltage levels at the first and second terminals of the sensing resistor. As the difference between the voltage levels at the first and second terminals of the sensing resistor 222 increases, the output voltage from the comparator 262 also increases. In an embodiment, the output voltage of the comparator 262 can increase proportionally to the increase in the voltage difference across the sensing resistor 222.

The output voltage of the comparator 262 is then provided to the cable drop compensation circuit 260, which in turn utilizes this voltage to monitor the voltage level of the sensing resistor 222. As the voltage across the sensing resistor 222 increases, the compensation circuit 234 injects a current, Icomp, into the voltage divider 246. The injected current can increase the voltage across resistor 248 of the voltage divider 246, which in turn increases the voltage provided to the first input terminal of the comparator 252. In an embodiment, the increase in the voltage provided to the first input terminal can cause the comparator 252 to provide a high voltage level to transistor 250. The high voltage at transistor 250 can active the transistor, which in turn can cause the PFC and PWM circuit 118 of FIG. 1 to increase the output voltage of the power adapter 100. Thus, as described above the compensation circuit 234 via the cable drop compensation circuit 260 can inject a current into the cable 223 to raise the voltage at the first input terminal of comparator 252 of the feedback regulator 232, which in turn results in the output voltage from the output filter 120 of FIG. 1 to rise to compensate for a voltage drop across the cable. For example, the higher the current across the cable 223, the larger amount of current, Icomp, injected by the compensation circuit 234 so that the voltage at the information handling system, located at the other end of the cable, is substantially the desired voltage level. In an embodiment, the desired voltage level provided to the information handling system can be 5 volts, 12 volts, 15 volts, 20 volts, or the like.

However, as the desired voltage level increases the amount of current, Icomp, injected into the cable 223 can also increase. For example, a higher amount of current can be injected into the cable when the desired voltage is 12 volts as compared to when the desired voltage is 5 volts. Therefore, the cable drop compensation circuit 260 can receive an indication of the desired voltage from the MCU 249. In an embodiment, when the adapter 200 is connect to the information handling system, the MCU 249 can communicate with the information handling system to determine the desired amount of voltage. The MCU 249 can then provide an indication of the desired amount of voltage to the cable drop compensation circuit 260 of the compensation circuit 234. The cable drop compensation circuit 260 can then set levels of the current, Icomp, to inject into the cable 223 based on the indication of the desired amount of voltage. Thus, the compensation circuit 234 can inject different amounts of current to compensate for the voltage drop across the cable, and the different amounts of current can be based on the voltage across the sensing resistor 222 and on the indication of the desired voltage for the information handling system received from the MCU 249. In an embodiment, the indication of the desired amount of voltage received from the MCU 249 can change the configuration of the cable drop compensation circuit 260 as described below with respect to FIG. 3.

Figure 3:
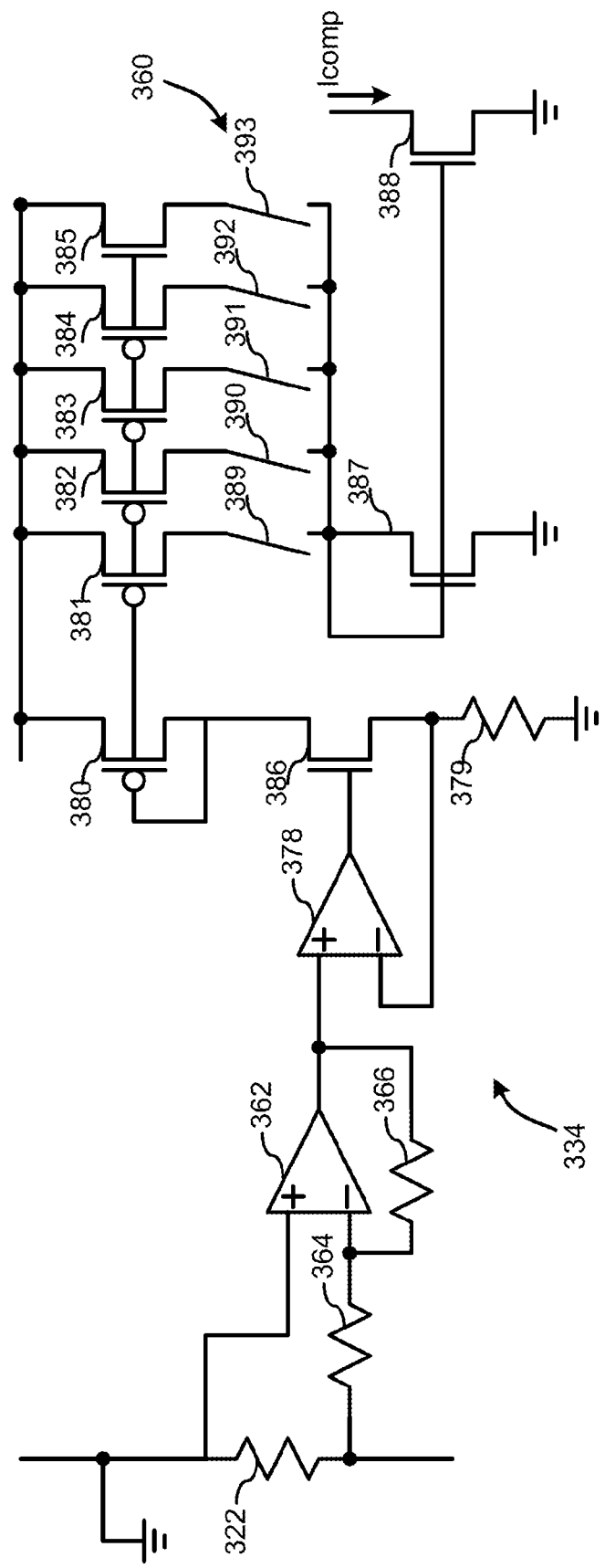
FIG. 3 is a schematic and block diagram of another embodiment of the portion of the alternating current power adapter according to at least one embodiment of the present disclosure.

FIG. 3 shows a portion of an adapter 300 including a sensing resistor 322 and a compensation circuit 334 according to at least one embodiment of the present disclosure. In an embodiment, the compensation circuit 334 includes a cable drop compensation circuit 360, a comparator 362, and resistors 364 and 366. The cable drop compensation circuit 360 includes a comparator 378, a resistor 379, transistors 380, 381, 382, 383, 384, 385, 386, 387, and 388 (380-388), and switches 389, 390, 391, 392, and 393 (389-393). The comparator 362 includes a first input terminal coupled to a first terminal of the sensing resistor 322, a second input terminal, and an output terminal. The resistor 364 includes a first terminal coupled to the second terminal of the sensing resistor 322, and a second terminal coupled to the second input terminal of the comparator 362. The resistor 366 includes a first terminal coupled to the second input terminal of the comparator 362, and a second terminal coupled to the output terminal of the comparator. The comparator 378 includes a first input terminal coupled to the output terminal of the comparator 362, a second input terminal, and an output terminal. The resistor 379 includes a first terminal coupled to the second terminal of the comparator 378, and a second terminal coupled to ground.

In an embodiment, the transistor 386 includes a first current electrode, a second current electrode coupled to the first terminal of the resistor 379, and a control electrode coupled to the output terminal of the comparator 378. In an embodiment, the transistor 380 includes a first current electrode, a second current electrode coupled to the first current electrode of the transistor 386, and a control electrode coupled to the second current electrode in a diode configuration. In an embodiment, the transistors 381-385 each have a first current electrode coupled to the first current electrode of the transistor 380, a second current electrode, and a control electrode coupled to the control electrode of the transistor 380. In an embodiment, the switches 389-393 each have a respective first terminal coupled to the second current electrode of respective transistors 381-385, and a second terminal coupled to the second terminals of the other switches. In an embodiment, the transistor 387 includes a first current electrode coupled to the second terminal of each of the switches 389-393, a second current electrode coupled to ground, and a control electrode coupled to its first current electrode in a diode configuration. In an embodiment, the transistor 388 includes a first current electrode coupled to a cable, such as cable 223 of FIG. 2, a second current electrode coupled to ground, and a control electrode coupled to the control electrode of the transistor 387.

During operation, the comparator 362 of the compensation circuit 334 determines the voltage of the sensing resistor 322 by comparing the voltage levels at the first and second terminals of the sensing resistor. As the difference between the voltage levels at the first and second terminals of the sensing resistor 3222 increases, the output voltage from the comparator 362 also increases. In an embodiment, the output voltage of the comparator 362 can increase proportionally to the increase in the voltage difference across the sensing resistor 322.

The output voltage of the comparator 362 is then provided to the comparator 378 of the cable drop compensation circuit 360, which in turn utilizes this voltage to turn on transistor 386. As the transistor 386 draws current, the transistors 380-385 are also turned on. Different amounts of current are provided to the transistor 387 in response to an amount that the transistors 380-385 are turned on and based on the number of switches 389-393 that are closed. For example, a higher voltage across sensing resistor 322 can cause the transistor 386 to be turned on more, which in turn causes transistors 380-385 to be turned on more as compared to a lower voltage across the sensing resistor. Similarly, the higher the number of switches 389-393 that are closed the higher the amount of current provided from the transistors 381-385 to control electrodes of transistors 387 and 388. The higher current applied to the transistors 387 and 388 can cause the transistors to turn on more than a lower current applied to the transistors, which in increases the current, Icomp, injected in a cable.

Thus, as the voltage across the sensing resistor 322 increases, the compensation circuit 334 injects a current, Icomp, into a cable. In the embodiment illustrated in FIG. 3, the injected current, Icomp, can be provided via the transistor 388. The current injected into the cable can compensate for a voltage drop across the cable. For example, the higher the current across the cable, the larger amount of current, Icomp, injected into the cable by the compensation circuit 334 so that the voltage at the information handling system, located at the other end of the cable, is substantially the desired voltage level. In an embodiment, the desired voltage level provided to the information handling system can be 5 volts, 7 volts, 12 volts, 20 volts, or the like.

However, as the desired voltage level increases the amount of current, Icomp, injected into the cable also can be increased. For example, a higher amount of current can be injected into the cable when the desired voltage is 12 volts as compared to when the desired voltage is 5 volts. Therefore, the cable drop compensation circuit 360 can receive an indication of the desired voltage level from an MCU, such as MCU 249 of FIG. 2. The MCU can provide the indication of the desired voltage level by controlling the number of switches 389-393 that are closed. For example, the higher the desired voltage level to be provided to the information handling system, the more switches 389-393 that are closed, which in turn causes a higher level of the injection current to be provided to the cable. Thus, the compensation circuit 334 can inject different amounts of current into a cable, such as cable 223 of FIG. 2, to compensation for the voltage drop across the cable, and the different amounts of current can be based on the voltage of the sensing resistor 322 and on an indication of the desired voltage level for the information handling system.

Figure 4:
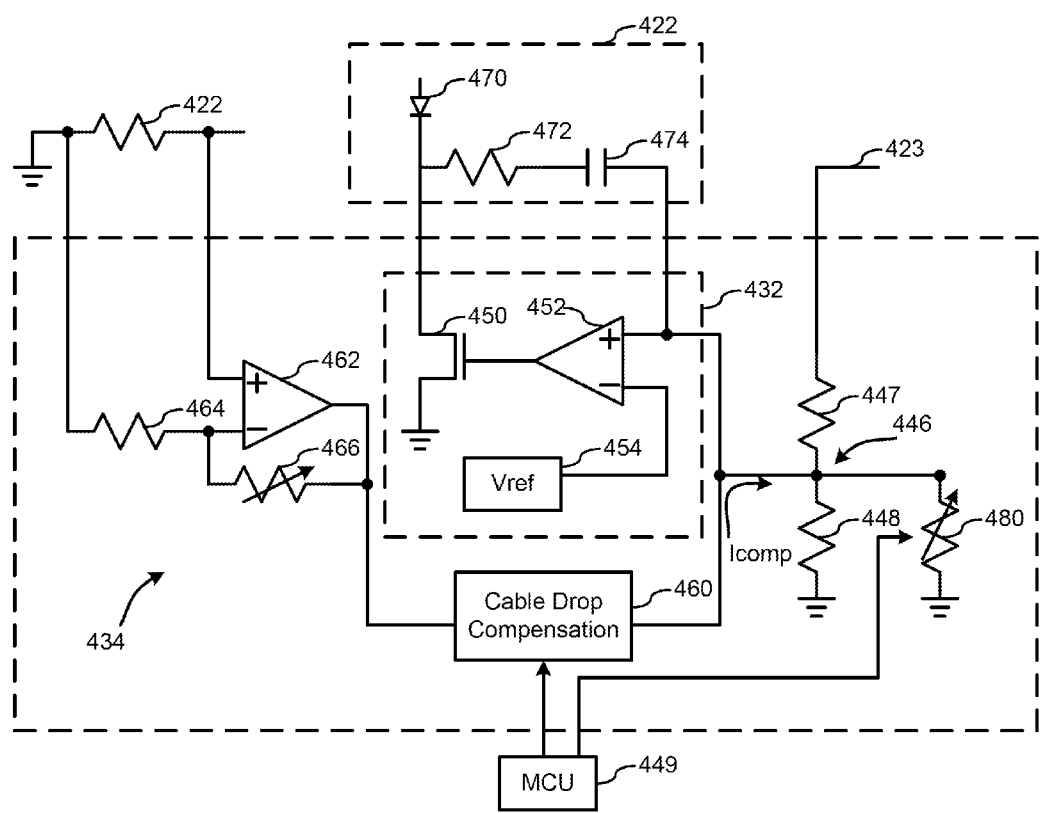
FIG. 4 is a schematic of another embodiment of a portion of the alternating current power adapter according to at least one embodiment of the present disclosure.

FIG. 4 shows a portion of an alternating current power adapter 400 according to at least one embodiment of the present disclosure. The AC power adapter 400 may include a sensing resistor 422, a cable 423, feedback/compensation circuitry 430, which in turn includes a feedback regulator 432 and a compensation circuit 434, an opto-coupler 442, a microcontroller unit (MCU) 449, and a resistor 480. In an embodiment, the feedback regulator 432 may include a transistor 450, a comparator 452, and a voltage reference 454. The transistor 450 includes a first current electrode coupled to the opto-coupler 442, a second current electrode coupled to a ground, and control electrode. The comparator 452 includes a first input terminal coupled to the opto-coupler 442, to the feedback/compensation circuitry 434, and to the cable 423, a second input terminal, and an output terminal coupled to the control electrode of the transistor 450. The voltage reference 454 includes an output terminal coupled to the second input terminal of the comparator 452. In an embodiment, the transistor 450, the comparator 452, and the voltage reference 454 combine to provide a feedback voltage to the opto-coupler 442. In this embodiment, the comparator 452 compares the voltage on cable 423 with the voltage provided by the reference voltage 454. The comparator 452 then provides an output voltage to the transistor 450 based on the comparison, and the output voltage turns on the transistor 450 to cause a current, such as the feedback signal discussed above, to flow through the opto-coupler 442.

In an embodiment, the opto-coupler 442 includes a diode 470, a resistor 472, and a capacitor 474. The diode 470 includes a first current electrode, and a second current electrode coupled to the first current electrode of the transistor 450 of the feedback regulator 432. The resistor 472 includes a first terminal coupled to the second current electrode of the diode 470, and a second terminal. The capacitor 474 includes a first terminal coupled to the second terminal of the resistor 472, and a second terminal coupled to the first input terminal of the comparator 452 of the feedback regulator 432. In an embodiment, the components of the opto-coupler 442 combine to provide the feedback signal from the feedback regulator 432 to a primary side, such as primary side 102 of FIG. 1, of the AC power adapter 400.

In an embodiment, the compensation circuit 434 includes a cable drop compensation circuit 460, a comparator 462, resistors 464 and 466, and a voltage divider 446, which in turn includes resistors 447 and 448. The cable drop compensation circuit 460 includes a first input terminal, a second input terminal coupled to the MCU 449, and an output terminal coupled to the first input terminal of the comparator 452 of the feedback regulator 432. The comparator 462 includes a first input terminal coupled to a first terminal of the sensing resistor 422, a second input terminal, and an output terminal coupled to the first input terminal of the cable drop compensation circuit 460. The resistor 464 includes a first terminal coupled to the second terminal of the sensing resistor 422, and a second terminal coupled to the second input terminal of the comparator 462. The resistor 466 includes a first terminal coupled to the second input terminal of the comparator 462, and a second terminal coupled to the output terminal of the comparator. The resistor 447 of the voltage divider 446 includes a first terminal coupled to the cable 423, and a second terminal coupled to the first input terminal of the comparator 452 and to the output terminal of the cable drop compensation circuit 460. The resistor 448 of the voltage divider 446 includes a first terminal coupled to second terminal of the resistor 447, and a second terminal coupled to ground.

During operation, the comparator 462 of the compensation circuit 434 determines the voltage across the sensing resistor 422 by comparing the voltage levels at the first and second terminals of the sensing resistor. As the difference between the voltage levels at the first and second terminals of the sensing resistor 422 increases, the output voltage from the comparator 462 also increases. In an embodiment, the output voltage of the comparator 462 can increase proportionally to the increase in the voltage difference across the sensing resistor 422.

The output voltage of the comparator 462 is then provided to the cable drop compensation circuit 460, which in turn utilizes this voltage to monitor the voltage level of the sensing resistor 422. As the voltage across the sensing resistor 422 increases, the compensation circuit 434 injects a current, Icomp, into the voltage divider 446. The injected current can increase the voltage across resistor 448 of the voltage divider 446, which in turn increases the voltage provided to the first input terminal of the comparator 452. In an embodiment, the increase in the voltage provided to the first input terminal can cause the comparator 452 to provide a high voltage level to transistor 450. The high voltage at transistor 450 can active the transistor, which in turn can cause the PFC and PWM circuit 118 of FIG. 1 to increase the output voltage of the power adapter 100. Thus, as described above the compensation circuit 434 via the cable drop compensation circuit 460 can inject a current into the cable 423 to raise the voltage at the first input terminal of comparator 452 of the feedback regulator 432, which in turn results in the output voltage from the output filter 120 of FIG. 1 to rise to compensate for a voltage drop across the cable. For example, the higher the current across the cable 423, the larger amount of current, Icomp, injected by the compensation circuit 434 so that the voltage at the information handling system, located at the other end of the cable, is substantially the desired voltage level. In an embodiment, the desired voltage level provided to the information handling system can be 5 volts, 12 volts, 15 volts, 20 volts, or the like.

However, as the desired voltage level increases the amount of current, Icomp, injected into the cable 423 can also increase. For example, a higher amount of current can be injected into the cable when the desired voltage is 12 volts as compared to when the desired voltage is 5 volts. Therefore, the cable drop compensation circuit 460 can receive an indication of the desired voltage from the MCU 449. In an embodiment, when the adapter 400 is connect to the information handling system, the MCU 449 can communicate with the information handling system to determine the desired amount of voltage. The MCU 449 can then provide an indication of the desired amount of voltage to the cable drop compensation circuit 460 of the compensation circuit 434 as described above with respect to FIG. 2.

In an embodiment, the MCU 449 can also control the voltage drop compensation provided by the cable drop compensation circuit 460 by adjusting the impedance of the resistor 480. In an embodiment, the resistor 480 can be a variable resistor, such that the impedance of the resistor can be controlled and set to different levels. The resistor 480 includes a first terminal coupled to the first terminal of resistor 448, and a second terminal coupled to ground, such that resistors 448 and 480 are in parallel. Thus, resistors 448 and 480 combine together to control the voltage in the middle of the voltage divider 446 based on the impedance of the resistors. In an embodiment, the MCU 449 can increase the voltage applied on cable 423, such that a greater voltage drop can be compensated, by increasing the impedance of resistor 480. For example, as the impedance of resistor 480 is increased by MCU 449, the voltage across resistors 448 and 480 also increases, such that the voltage at the second terminal of comparator 452 increases. The higher voltage at the second input terminal of comparator 452 can cause the output voltage of the output filter 120 of FIG. 1 to increase, such that a higher voltage is applied to the cable 423 and the desired voltage can be provided to the information handling system. Thus, the MCU 449 can increase the impedance of the resistor 480 in response to a higher desired voltage to be provided to the information handling system.

Figure 5:
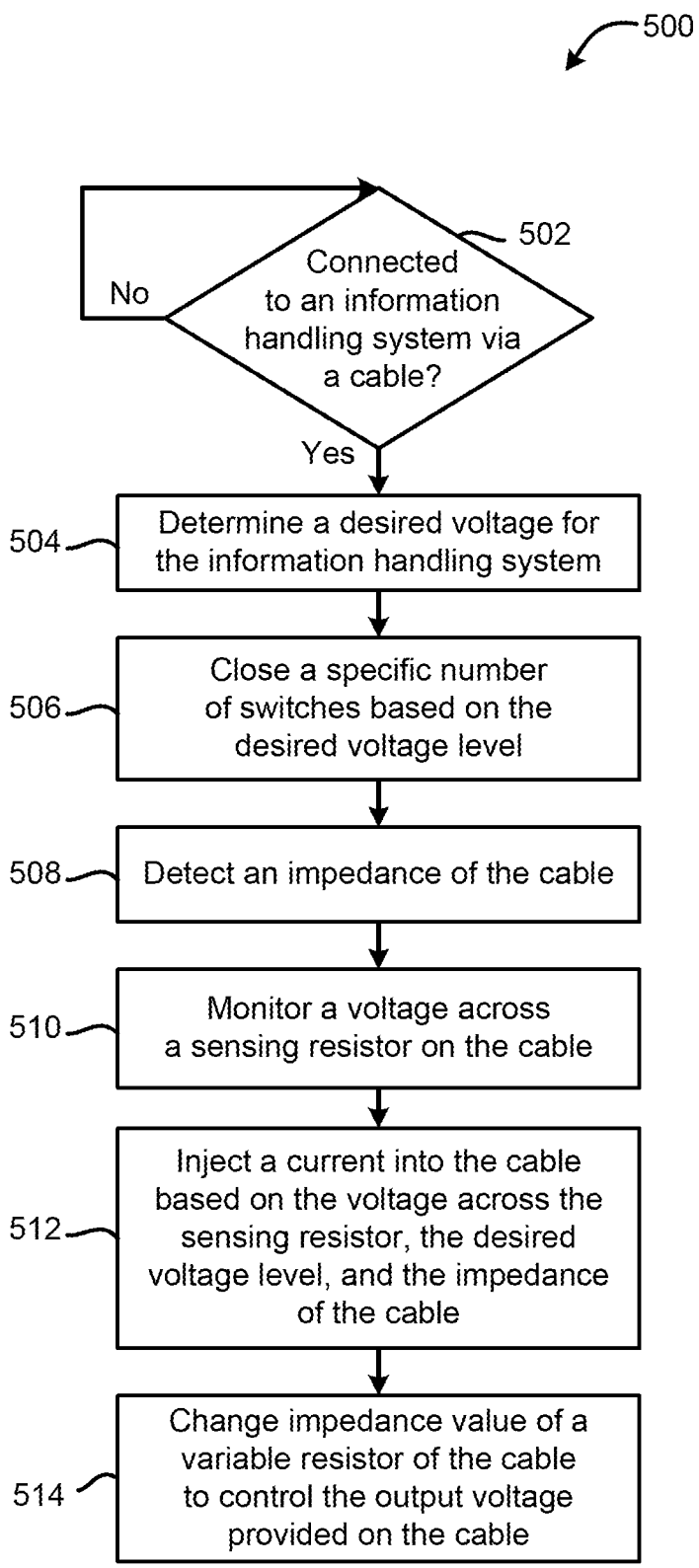
FIG. 5 illustrates a method for compensating for direct current voltage loss of a direct current cord of the alternating current power adapter according to at least one embodiment of the present disclosure.

FIG. 5 illustrates a method 500 for compensating for direct current voltage loss of a direct current cord of an alternating current (AC) power adapter according to at least one embodiment of the present disclosure. At block 502, a determination is made whether the power adapter is connected to an information handling system via a cable. In an embodiment, the information handling system can be a personal computer, a laptop computer, a docking station, or the like. In an embodiment, a microcontroller unit (MCU) can detect when the power adapter is connected to an information handling system. When the power adapter is connected to an information handling system, a desired voltage for the information handling system can be determined at block 504. In an embodiment, the MCU can determine the desired voltage for the information handling system. In an embodiment, the desired voltage can be 5 volts, 12 volts, 20 volts, or the like.

At block 506, a specific number of switches within a compensation circuit are closed based on the desired voltage level. An impedance of the cable is detected at block 508. In an embodiment, the impedance of the cable can cause a voltage drop across the cable, such that the voltage on one side of the cable is not equal to the voltage on the other side of the cable. Thus, the voltage provided, by a power adapter, to the cable may not be the same voltage that is received at an information handling system at the other side of the cable. At block 510, a voltage across a sensing resistor on the cable is monitored. In an embodiment, the voltage across the sensing resistor can vary based on a current provided through the cable. At block 512, a current is injected into the cable based on the voltage across the sensing resistor, on the desired voltage level, and on the impedance of the cable. In an embodiment, the injected current increases a feedback voltage in the power adaptor, which in turn results in a higher voltage being applied to the cable to overcome the voltage drop of the cable. At block 514, an impedance value of a variable resistor in the cable is changed based on the voltage across the sensing resistor, and on the desired voltage level. In an embodiment, the change in impedance can vary the voltage on the cable. For example, the higher the impedance of the variable resistor can cause a higher a feedback voltage, which in turn results in a higher voltage being applied to the cable.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power adapter comprising:
   a cable to provide a direct current voltage of a specific voltage level to an information handling system;
   a sensing resistor coupled to the cable;
   a compensation circuit coupled to the sensing resistor, the compensation circuit to monitor a voltage level across the sensing resistor, and to inject a current into the cable based on the voltage level across the sensing resistor, the compensation circuit including:
      a plurality of switches including first and second switches, wherein different combinations of the switches are closed based on the specific voltage level; and
   a microcontroller unit, the microcontroller unit to determine the specific voltage level based on a desired voltage level to be received at the information handling system, to close the first switch in response to the desired voltage level being a first voltage level, and to close both the first and second switches in response to the desired voltage level being a second voltage level, wherein the second voltage level is higher than the first voltage level.

2. The power adapter of claim 1, wherein a higher number of the switches are closed in response to a higher specific voltage level.

3. The power adapter of claim 1, further comprising:
   a variable resistor coupled to the compensation circuit, wherein the microcontroller unit is configured to vary an impedance of the variable resistor to change a voltage level of the direct current voltage.

4. The power adapter of claim 1, wherein a voltage drop occurs across the cable based on a current provided on the cable and on a resistance of the cable.

5. The power adapter of claim 4, wherein the current injected into the cable increases the direct current voltage provided to the cable to compensate for the voltage drop across the cable.

6. A power adapter comprising:
   a primary side to rectify an alternating current voltage; and
   a secondary side coupled to the primary side, the secondary side to provide a direct current voltage of a specific voltage level to a cable, the second side including:
      a sensing resistor; and
      a compensation circuit coupled to the sensing resistor, the compensation circuit to monitor a voltage level across the sensing resistor, and to inject a current into the cable based on the voltage level across the sensing resistor, the compensation circuit including:
         a plurality of switches including first and second switches, wherein different combinations of the switches are closed based on the specific voltage level; and
      a microcontroller unit, the microcontroller unit to determine the specific voltage level based on a desired voltage level to be received at an information handling system, to close the first switch in response to the desired voltage level being a first voltage level, and to close both the first and second switches in response to the desired voltage level being a second voltage level, wherein the second voltage level is higher than the first voltage level.

7. The power adapter of claim 6, wherein a higher number of the switches are closed in response to a higher specific voltage level.

8. The power adapter of claim 6, wherein a voltage drop occurs across the cable based on a current provided on the cable and on a resistance of the cable.

9. The power adapter of claim 8, wherein the current injected into the cable increases the direct current voltage provided to the cable to compensate for the voltage drop across the cable.

10. The power adapter of claim 8, wherein the current injected into the cable causes the specific voltage level to be provided to the information handling system coupled to the cable.

11. A method comprising:
   determining a desired voltage level to be provided to an information handling system via a cable;
   determining a desired voltage level to be received at the information handling system;
   closing a first switch of a plurality of switches in response to the desired voltage level being a first voltage level;
   closing both the first switch and a second switch of the switches in response to the desired voltage level being a second voltage level, wherein the second voltage level is higher than the first voltage level;

monitoring a voltage level across a sensing resistor of the cable; and injecting a current into the cable based on the desired voltage level and the voltage level across the sensing resistor.

12. The method of claim 11 further comprising:

determining whether a power adapter is connected to the information handling system via the cable prior to determining the desired voltage level.

13. The method of claim 12 wherein a microcontroller unit determines whether the power adapter is connected to the information handling system.

14. The method of claim 11 wherein a microcontroller unit determines the desired voltage level for the information handling system.

15. The method of claim 11 further comprising:

changing an impedance of a variable resistor based on the desired voltage level.

* * * * *